May 1, 1928. Re. 16,947
H. W. WILLIAMS
MOTOR CONTROL SYSTEM
Original Filed Sept. 8, 1923
Fig. 2.
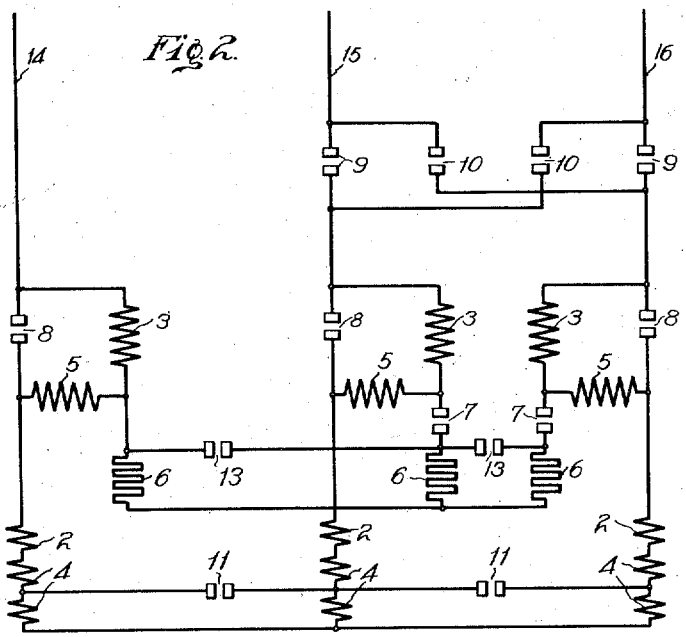
Fig. 1.
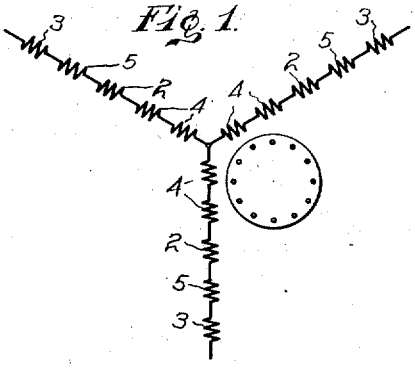
Fig. 3.
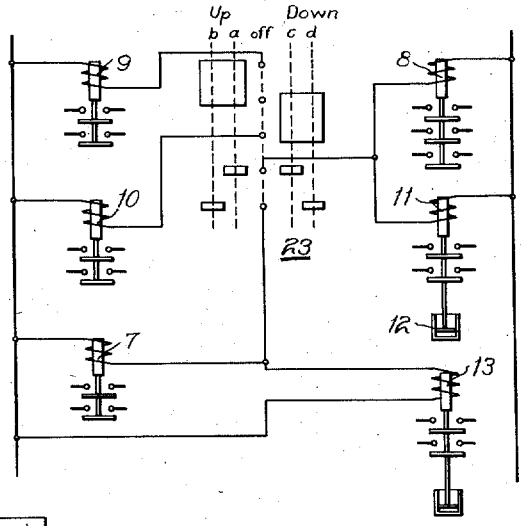
Fig. 4.
| Up Accel. | | | | | | Up Decel. | | | |
|---|---|---|---|---|---|---|---|---|---|
| Sw | a | | Tr. | b | | b | Trans. | | a |
| 7 | | | o | o | o | o | o | | |
| 8 | o | o | o | | | | o | o | o |
| 9 | o | o | o | o | o | o | o | o | o |
| 11 | | o | o | | | | | | o |
| 13 | | | | | o | o | o | | |
INVENTOR
Harold W. Williams
BY
Wesley G. Carr
ATTORNEY Reissued May 1, 1928. Re. 16,947

UNITED STATES PATENT OFFICE.

HAROLD W. WILLIAMS, OF EAST PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Original No. 1,549,698, dated August 11, 1925, Serial No. 661,538, filed September 8, 1923. Application for reissue filed August 10, 1927. Serial No. 212,114.

My invention relates to motor-control systems and it has particular relation to such systems of control as are employed in connection with elevators, machine tools and similar machines.

An object of my invention is to provide means for controlling the speed and the torque of an alternating-current motor of the two-speed type commonly employed in elevator service and having separate low and high-speed windings.

My invention is more particularly applicable to the control of a two-speed motor of a well-known squirrel-cage type.

In the operation of alternating-current motors of the type herein described, it is common practice to start the motor by connecting its low-speed winding to the source of power and thereafter transfer directly to the high-speed winding, with or without resistors in circuit therewith.

In such systems, some difficulty has been experienced in obtaining smooth operation. In my system of control, I propose to start the motor by means of its low-speed winding. Next, in transition, I connect the high and low-speed windings in parallel relation and provide means for ensuring a relatively weak excitation of the low-speed windings. Next, the low-speed windings are shunted and the excitation of the high-speed windings is increased to its maximum value.

In systems heretofore known it has been essential that a definite sequence of operation of the transition switches be maintained: otherwise the motor either lost torque or the supply circuit was short-circuited, depending upon whether the corresponding phases of the two windings were initially connected in series or in parallel relation. As is hereinafter described, with my system the sequence of operation of the transition switches is not material, neither loss of torque nor short-circuit being caused, regardless of the sequence of operation.

To effect deceleration of the motor, the speed windings are first connected in the previously named parallel relation, after which the high-speed windings are de-energized and finally the excitation of the low-speed winding is increased to obtain a minimum desirable operation speed. Again, however, the sequence of transition is immaterial.

My invention will be described in connection with the accompanying drawing, in which Figure 1 is a diagrammatic representation of a two-speed, three-phase, alternating-current squirrel-cage motor employed in connection with my invention, Fig. 2 is a diagrammatic representation of the main circuits and apparatus embodying my invention, Fig. 3 is a diagrammatic representation of the control circuits that are employed in the operation of the system shown in Fig. 2, and Fig. 4 is a sequence chart indicating the operation of switches employed in Fig. 2.

Referring to the drawing, a two-speed alternating-current motor 1 is provided with low-speed primary windings 2 and high-speed primary windings 3. These windings are connected in series relation with a plurality of reactors 4 and 5, which are respectively employed for low-speed and for high-speed operation. Resistor sections 6 are arranged for connection in circuit with the high-speed windings 3 through a switch 7. A three-pole switch 8 provides means for shunting the high-speed windings 3 and rendering the low-speed windings 2 effective. Double-pole reversing switches 9 and 10 are employed in the customary manner. Portions of the "low-speed" reactors 4 may be shunted by a double-pole switch 11 that is provided with a retarding device 12.

Also, a double-pole switch 13 is arranged for shunting resistor sections 6. This switch is also provided with retarding means. Both switches 11 and 13 are retarded only in closing. The various switches are operated by means of a reversible master switch 23 of a familiar type having a plurality of operating positions *a*, *b*, *c* and *d*. A source of power supply for the motor comprises line conductors 14, 15 and 16. I have illustrated connections for a three-phase induction motor, but, of course, a two-phase motor or motors of other suitable types may be similarly employed.

Assuming the apparatus to be in its inoperative or illustrated positions, the motor 1 may be operated in an "upward" direction by actuating the master switch 23 to the left. In position *a* (see sequency chart, Fig. 4) a circuit is provided for effecting the closure of reversing switch 9 and "low-speed" switch S. Power is then supplied to the motor windings 2, with reactors 4 in circuit therewith. If master switch 23 is maintained in position *a*, switch 11 will close to shunt a portion of reactors 4, whereby the motor is provided with sufficient torque to start the desired maximum load. A light load may be started prior to the closure of switch 11. However, the primary object of the additional sections of reactors 4 will hereinafter appear.

When the master switch 23 is actuated toward position *b*, switch 7, may close prior to the opening of switch 8, whereupon high-speed windings 3 are connected through resistor sections 6 in parallel relation to low-speed windings 2. This position affords a transition period or, if desired, may serve as an operating position in which the motor operates at a speed intermediate its minimum and maximum speeds, depending upon the degree of excitation of the low-speed windings 2.

When the master switch 23 is moved to position *b*, switch 8 opens and the motor is further accelerated in accordance with the excitation of the windings 3. Finally switch 13 closes to shunt resistors 6, whereupon the motor operates at its maximum speed.

It should be noted, in connection with the foregoing description, that the motor speed-windings are at no time disconnected nor is the power supply interrupted so that a fairly uniform torque is developed by the motor in accordance with the arrangement of the reactors and resistors which are, of course, designed for limiting the currents in a well-known manner.

The motor is decelerated by returning master switch 23 toward the "off" positions, passing through position *a*. Switch 8 is reclosed, re-establishing the above-described parallel relation of motor windings 2 and 3, and, upon the re-opening of switch 7, the high-speed windings 3 are de-energized and the motor is further decelerated, since only the low-speed windings 2 are then energized. Switch 11 starts to close but is retarded for a sufficient period, whereby the torque of the motor, which is for the moment operating above its lower synchronous speed, is suitably reduced. The effect of the additional reactor sections 4, which are controlled by switch 11, is to prevent a too abrupt change in the speed of the motor, occasioned by its regenerative action. Sufficient time is allowed for the closure of switch 11 so that the motor speed is first suitably reduced. Under slow speed conditions, reactors 4 have little effect upon the speed regulation of the motor so that it is, ordinarily, unnecessary to provide means for entirely shunting these reactors from the circuit. If it is desirable to operate the motor at slow speed for long periods, an additional switch may be, of course, provided to entirely shunt these reactors.

According to my invention, I am enabled to accelerate and decelerate a motor having separate high and low-speed windings without disconnecting these windings, whereby a fairly uniform torque is obtainable and, consequently, smooth and flexible speed control. Also, the switching arrangement is such that the line conductors cannot be short-circuited by failure of any of the speed-controlling switches to function.

In the arrangement of apparatus, as illustrated in Fig. 2, it is possible to provide for a different sequence of operation and to obtain still other operating speeds as, for example, when both the high and low-speed switches 7 and 8 are open, and the motor windings are all connected in series relation. Resistors may be substituted in place of reactors 4 and 5, when desirable, but I prefer to employ the arrangement illustrated, particularly for hoisting applications.

Operation of the motor in a reverse direction is obtained in a manner similar to that described above, upon the closure of reversing switch 10 in place of reversing switch 9 by the manipulation of master switch 23 to the right, through positions *c* and *d*, as will be readily understood.

I have described and illustrated my invention in simple form, but various modifications may be made therein without departing from the spirit and scope thereof.

I claim as my invention:

1. The method of accelerating an alternating-current motor having low and high-speed windings connected in series relation, which consists in shunting the high-speed windings, connecting said high and low-speed windings in parallel relation, diminishing the effect of said low-speed windings and finally shunting said low-speed windings.

2. The method of accelerating an induction motor having low and high-speed windings connected in series relation, which consists in energizing the low-speed windings, connecting said low and high-speed windings in parallel relation, lessening the effect of said low-speed windings, and finally, shunting said low-speed windings.

3. The method decelerating an alternating-current motor having low and high-speed windings connected in series relation, which consists in connecting the low and high-speed windings in parallel relation when the effect of the low-speed windings is relatively weak, disconnecting said high-speed windings and strengthening the effect of the low-speed windings.

4. The combination with an alternating-current motor having low and high-speed windings connected in series relation, and reactors alternating in position with said windings, of means for selectively shunting said windings and for connecting said windings in parallel relation without interrupting the motor circuit.

5. The combination with an alternating-current motor having low and high-speed windings connected in series relation, and reactors alternating in position with said windings, of means for selectively shunting said windings and for connecting said windings in parallel relation without disconnecting said windings.

6. The combination with an alternating-current motor having low and high-speed windings connected in series relation, and current-limiting means alternating in position with said windings, of means for selectively shunting said windings and for connecting said windings in parallel relation without interrupting the motor circuit.

7. The combination with an alternating-current motor having low and high-speed windings connected in series relation, and current-limiting means alternating in position with said windings, of means for selectively shunting said windings and for connecting said windings in parallel relation without disconnecting said windings.

8. The combination with an alternating-current motor having low and high-speed windings connected in series relation, and reactors in circuit with said windings, of means for selectively shunting said windings and for connecting said windings in parallel relation without interrupting the motor circuit.

9. In a control system for multi-phase alternating current motors having high-speed windings and low-speed windings, a source of power, a switch for each winding, a current-limiting device, and means for connecting said windings, said switches and said device to said source whereby transition from one winding to the other winding may be made with at least one of said windings active at all times regardless of the sequence of operation of said switches.

10. In a control system for multi-phase alternating current motors having high-speed windings and low-speed windings, a source of power, a switch for each of said windings, means for selectively operating said switches, a current-limiting device, and means for connecting said windings, said switches and said device to said source of power whereby operation of said switches will connect said windings in series relation or in parallel relation or either winding alone to said source of power.

11. In a control system for multi-phase alternating current motors having high-speed windings and low-speed windings, a source of power, a switch for each of said windings, means for selectively operating said switches, a current-limiting device, and means for connecting said windings, said switches and said device to said source of power whereby operation of either of said switches will connect the corresponding windings to said source exclusive of the other, operation of both of said switches will connect said windings to said source in parallel relation and non-operation of both of said switches will connect said windings to said source in series relation.

12. In a control system for multi-phase alternating current motors, having a high-speed winding and a low-speed winding, a multi-phase source of power, means connecting said source of power to said windings at will, means for permanently connecting said phase of said high-speed winding in series relation with the corresponding phase of said low-speed winding, a current-limiting device connected therebetween, means for shunting each phase of said high-speed winding and its associated current-limiting device, and means for connecting together all of the phases of the high-speed windings at points between the high-speed windings and their associated current-limiting devices.

13. In a control system for multi-phase alternating current motors having a high-speed winding and a low-speed winding, a multi-phase source of power, means for connecting said source of power to said windings at will, means permanently connecting each phase of said high-speed winding in series relation with the corresponding phase of said low-speed winding, a current-limiting device connected therebetween, multi-pole switch means for shunting at will said high-speed windings and their associated current-limiting devices, and multi-pole switch means for connecting together at will all of the high-speed windings at points between the high-speed windings and their associated current-limiting devices, whereby said motor when connected to said source of power will constantly exert torque regardless of the sequence of operation of said means.

14. In a control system for multi-phase alternating current motors having a high-speed winding and a low-speed winding whereby transition from one winding to the other may be accomplished without loss of torque and without short-circuit, the combination of a plurality of current-limiting devices, means for permanently connecting corresponding phases of said high-speed windings and said low-speed windings in series relation, said current-limiting devices being severally disposed therebetween, switch means for simultaneously shunting the high-speed phase windings and their associated current-limiting devices, and switch means for simultaneously connecting together all of the phases of said high-speed winding at points between said windings and said current-limiting devices.

15. In a control system for multi-phase alternating current motors having a high-speed winding and a low-speed winding whereby transition from one winding to the other may be accomplished without loss of torque and without short-circuit, the combination of a plurality of reactors, means for permanently connecting corresponding phases of said high-speed windings and said low-speed windings in series relation, said reactors being severally disposed therebetween, switch means for simultaneously shunting the high-speed phase windings and their associated reactors, and switch means for simultaneously connecting together all of the phases of said high-speed winding at points between said windings and said reactors.

HAROLD W. WILLIAMS.